Patented July 12, 1932

1,867,332

UNITED STATES PATENT OFFICE

HORACE A. SHONLE, OF INDIANAPOLIS, INDIANA, ASSIGNOR TO ELI LILLY AND COMPANY, OF INDIANAPOLIS, INDIANA, A CORPORATION OF INDIANA

ETHANOL-AMINE SALTS OF THEOPHYLLINE AND PROCESS OF MAKING THEM

No Drawing.   Application filed November 8, 1930.   Serial No. 494,450.

My invention relates to ethanol-amine salts of theophylline, in both solid form and in solution.

Theophylline is a recognized diuretic. However, its slight solubility has limited its usefulness; so that heretofore it has been generally found necessary to make certain double salts of it in order to get sufficient solubility for therapeutic use.

I have produced certain new ethanol-amine salts of theophylline, both in solid form and in solution, and have found that these salts have a greater solubility than theophylline itself, especially the mono-ethanol-amine salt. The ethanol amines which I have used for forming these salts are the mono-ethanol amine and tri-ethanol amine; and I have found the mono-ethanol amine to produce the more soluble salt.

These salts are white crystal-like substances when in solid form, and have the characteristic diuretic action of the theophylline from which they are obtained. These ethanol-amine salts of theophylline are substantially non-hygroscopic, and do not discolor when exposed to air.

At present, I regard the mono-ethanol-amine salt of theophylline as the most desirable, because of its very ready solubility.

In preparing these ethanol-amine salts, one mol of theophylline is suspended in a suitable solvent, such as water or ethyl alcohol, and to this is added one mol or slightly more than one mol of the ethanol-amine. The amount of water or alcohol used is preferably such that it will dissolve the resulting ethanol-amine salt of theophylline. If the salt is desired in the form of a solution, it may be filtered at this stage; and the filtrate, after sterilization, and dilution to any desired point, may be put up in ampoules or other containers. This is the more frequently done when the salt is formed in water solution. If the salt is desired in solid form, the solution is then concentrated under vacuum, avoiding exposure to $CO_2$, until the solid salt separates out; but the evaporation is desirably stopped while there is still a little mother liquor remaining. The solid salt is separated from the mother liquor, as by filtration, and dried at a moderate temperature, such as 40 to 50° C., preferably under vacuum, and again avoiding exposure to $CO_2$ throughout. The water content of this solid salt may thus be reduced to less than 1%. The use of a high temperature, as 100° for example, tends to cause a slight discoloration. The solid salts thus obtained may be administered orally, usually in capsules or tablets; or may be dissolved in water, to produce solutions of any desired concentration, as for administration hypodermically.

The salts thus obtained have the general formula:

(1)   $(C_7H_7N_4O_2)NH_{4-x}(C_2H_5O)_x$ 

in which $x$ may be either 1, 2, or 3, but is the same in both occurrences.

The following are examples of salts embodying my invention, and the processes of making them:

*Example 1.*—Mono-ethanol-amine theophylline.

108 g. of theophylline mono-hydrate are suspended in 300 cc. of distilled water, to which 36 cc., which is slightly more than one molar proportion, of mono-ethanol-amine are added. On stirring at room temperature, the theophylline goes into solution as its mono-ethanol-amine salt is formed. This solution is filtered; and to obtain the solid salt may be concentrated under vacuum until such salt separates out. This solid mono-ethanol-amine salt of theophylline is separated from the adhering mother liquor by filtration, and dried, preferably under vacuum, at a moderate temperature, as at 50° C.

The mono-ethanol-amine salt of theophylline may be represented by the following formula:

(2)   $(C_7H_7N_4O_2)NH_3(C_2H_5O)$. 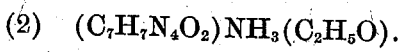

It is a bitter-tasting white solid readily soluble in water, less soluble in 95% alcohol, and still less soluble in ether. Its aqueous solution reacts alkaline to phenolphthalein. Passing $CO_2$ through a 5% aqueous solution of this salt causes the precipitation of the alkaloid theophylline. The solid salt melts at 255–260° C. (uncorrected), usually with partial decomposition and with preliminary shrinking about 176–178° C.

*Example 2.*—Mono-ethanol-amine theophylline.

19.81 g. (1 mol) of theophylline mono-hydrate are added to about 500 cc. of 90% to 95% ethyl alcohol, and to this are added 6.11 g. (1 mol) of mono-ethanol-amine. On stirring and warming, the theophylline goes into solution as its mono-ethanol-amine salt is formed. The alcoholic solution of mono-ethanol-amine theophylline is filtered, and evaporated under vacuum to just short of dryness. The mono-ethanol-amine theophylline which has separated out is freed from its mother liquor by filtration. The solid salt is dried, preferably under vacuum, at a moderate temperature, as at 50° C.

The salt thus obtained is the same salt as that obtained by the process of Example 1; so that the characteristics of the salt are the same as those given for the salt obtained by Example 1.

*Example 3.*—Tri-ethanol-amine theophylline.

19.81 g. (1 mol) of theophylline mono-hydrate are suspended in about 80 cc. of distilled water, to which 14.44 g. (1 mol) of tri-ethanol-amine are added. On stirring and warming, the theophylline goes into solution as its tri-ethanol-amine salt is formed. This solution is filtered; and, to obtain the solid salt, may be concentrated under vacuum. The solid tri-ethanol-amine salt of theophylline is separated from the adhering mother liquor by filtration, and dried, preferably under vacuum, at a moderate temperature.

The tri-ethanol-amine salt of theophylline may be represented by the following formula:

(3)    $(C_7H_7N_4O_2)NH(C_2H_5O)_3$.

It is a bitter-tasting white solid soluble in water, and less soluble in ether. Its aqueous solution reacts alkaline to phenolphthalein. Passing $CO_2$ through a 5% aqueous solution of this salt causes a precipitation of the alkaloid theophylline. The solid salt melts at 235–245° C. (uncorrected), usually with partial decomposition and preliminary shrinking around 200° C.

I claim as my invention:

1. The process of making an ethanol-amine salt of theophylline, comprising suspending the theophylline in a solvent in which the ethanol-amine salt to be formed is soluble, and adding the ethanol-amine to such suspension.

2. The process of making an ethanol-amine salt of theophylline, comprising suspending the theophylline in a solvent in which the ethanol-amine salt to be formed is soluble, and adding the ethanol-amine to such suspension, concentrating under vacuum the solution of the resultant salt, and avoiding exposure to $CO_2$, until the salt appears in solid form.

3. The process of making a mono-ethanol-amine salt of theophylline, comprising suspending the theophylline in a solvent in which the ethanol-amine salt to be formed is soluble, and adding the mono-ethanol-amine to such suspension.

4. The process of making a mono-ethanol-amine salt of theophylline, comprising suspending the theophylline in a solvent in which the ethanol-amine salt to be formed is soluble, and adding the mono-ethanol-amine to such suspension, concentrating under vacuum the solution of the resultant salt, and avoiding exposure to $CO_2$, until the salt appears in solid form.

5. An ethanol-amine salt of theophylline, having the general formula:

$$(C_7H_7N_4O_2)NH_{4-x}(C_2H_5O)_x$$

in which $x$ is an integer between 1 and 3 inclusive, and is the same in both occurrences.

6. The mono-ethanol-amine salt of theophylline, having the formula:

$$(C_7H_7N_4O_2)NH_3(C_2H_5O)$$

and when in solid form being a bitter-tasting white solid readily soluble in water, less soluble in 95% alcohol, and still less soluble in ether, and when in aqueous solution reacting alkaline to phenolphthalein.

7. The tri-ethanol-amine salt of theophylline, having the formula:

$$(C_7H_7N_4O_2NH(C_2H_5O)_3$$

and when in solid form being a bitter-tasting white solid soluble in water and less soluble in ether, and when in aqueous solution reacting alkaline to phenolphthalein.

In witness whereof, I have hereunto set my hand at Indianapolis, Indiana, this 6th day of November, A. D. one thousand nine hundred and thirty.

HORACE A. SHONLE.